(12) United States Patent
Chen

(10) Patent No.: US 7,127,253 B2
(45) Date of Patent: Oct. 24, 2006

(54) PENALTY OF CELL RESELECTION FOR A WIRELESS DEVICE

(75) Inventor: Rex Huan-Yueh Chen, Chi-Lung (TW)

(73) Assignee: ASUSTeK Computer Inc., Taipei (TW)

( * ) Notice: Subject to any disclaimer, the term of this patent is extended or adjusted under 35 U.S.C. 154(b) by 255 days.

(21) Appl. No.: 10/248,730

(22) Filed: Feb. 13, 2003

(65) Prior Publication Data
US 2004/0162074 A1  Aug. 19, 2004

(51) Int. Cl.
*H04Q 7/20* (2006.01)
(52) U.S. Cl. .................. 455/449; 455/447; 455/448; 455/436; 455/437
(58) Field of Classification Search ........... 455/67.11, 455/432.1–432.3, 434, 435.1–435.3, 436, 455/447–449
See application file for complete search history.

(56) References Cited

U.S. PATENT DOCUMENTS

| | | | |
|---|---|---|---|
| 6,192,245 B1 * | 2/2001 | Jones et al. .................. 455/437 |
| 6,546,251 B1 * | 4/2003 | Dalsgaard et al. ........... 455/437 |
| 6,546,252 B1 * | 4/2003 | Jetzek et al. ................ 455/437 |
| 6,751,472 B1 * | 6/2004 | Muhonen .................. 455/553.1 |
| 6,788,952 B1 * | 9/2004 | Jokimies et al. ............. 455/525 |
| 2001/0011019 A1 * | 8/2001 | Jokimies ...................... 455/449 |
| 2001/0031638 A1 * | 10/2001 | Korpela et al. .............. 455/434 |
| 2001/0055966 A1 * | 12/2001 | Hanly ......................... 455/422 |
| 2002/0037721 A1 * | 3/2002 | Tu et al. ..................... 455/434 |
| 2002/0068581 A1 * | 6/2002 | Salonaho .................... 455/456 |
| 2002/0197992 A1 * | 12/2002 | Nizri et al. .................. 455/435 |

OTHER PUBLICATIONS

3GPP TS 25, 304 (v3.12.0, Dec. 2002).
3GPP TR 25, 922 (v3.7.0, Mar. 2002) (p. 9-12, Chapter 4).
3GPP (10.3.2.3 & 10.3.2.4 p. 382-384).

* cited by examiner

*Primary Examiner*—Charles N Appian
*Assistant Examiner*—Suhail Khan
(74) *Attorney, Agent, or Firm*—Winston Hsu

(57) ABSTRACT

An improved device and method for determining when to start a timer that applies a temporary offset to a signal quality measurement of a cell that is a candidate for reselection in a 3GPP Hierarchical Cell Structured wireless communications system. For a cell ranking criterion R, the timer is started to apply the temporary offset according to present invention rules that insure that the temporary offset is not applied until a candidate is eligible for reselection, preventing premature expiration of the timer and unintended cell reselection. A present invention mobile unit that uses the improved method includes a housing, a central processor, a timer for applying the temporary offset, and a memory. The memory includes computer code that applies the claimed invention rules for starting the timer.

12 Claims, 8 Drawing Sheets

$$H_s = Q_{meas_s} - Q_{hcs_s}$$

$$H_n = Q_{meas_n} - Q_{hcs_n} - T_{o_n} * L_n$$

Fig. 4 Prior Art $$T_{O_n} = TEMP\_OFFSET_n * W(PENALTY\_TIME_n - T_n)$$

$L_n = 0$ if $HCS\_PRIO_n = HCS\_PRIO_s$ $L_n = 1$ if $HCS\_PRIO_n \Diamond HCS\_PRIO_s$ $W(x) = 0$ for $x<0$
$W(x) = 1$ for $x>=0$

Fig. 5 Prior Art $$R_s = Q_{meas_s} + Q_{hyst_s}$$

$$R_n = Q_{meas_n} - Q_{offset_{s,n}} - T_{O_n} * (1-L_n)$$

Fig. 6 Prior Art

PENALTY OF CELL RESELECTION FOR A WIRELESS DEVICE

BACKGROUND OF INVENTION

1. Field of the Invention

The present invention relates to a wireless communications network. In particular, the present invention discloses a method for a mobile unit, often known as a UE (User Equipment), to correctly start a timer in the UE that applies a penalty for cell reselection in a $3^{rd}$ Generation Partnership Project (3GPP) service area.

2. Description of the Prior Art

Please refer to FIG. 1. FIG. 1 is a simple block diagram of a wireless communications network 10, which is defined by the $3^{rd}$ Generation Partnership Project (3GPP) specifications. The wireless communications network 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN for short. Each RNS 20 comprises one radio network controller (RNC) 22 that is in communications with a plurality of Node Bs 24. Each Node B 24 is a logical node responsible for radio transmission/reception in one or more cells to/from the UE and each cell has its radio coverage area. The wireless communications network 10 assigns a mobile unit 40 (generally termed a "UE" for User Equipment) to a particular RNS 20, which is then termed the serving RNS (SRNS) 20s of the UE 40.

Additionally, a network may utilize a hierarchical cell structure (HCS). FIG. 2 illustrates an example HCS 100 but another HCS may be structured quite differently and have more or fewer layers. In this example, pico cells 105 have the smallest ranges. Micro cells 110 have a larger coverage area than the pico cells 105. Similarity, macro cells 120 have a larger coverage area than micro cells 110. The different hierarchical layers can be created using different frequencies, but different frequencies may also be used on the same layer to cope with system load, for example. Generally, in a network utilizing an HCS the system capacity progressively improves as the UE 40 reselects from the macro cell 120 to the pico cell 105. Therefore, typically, the relative HCS priority given to a specific cell is cell size dependent and increases from the macro cell 120 to the pico cell 105.

Data destined for the UE 40 is sent by the CN 30 (or UTRAN 20u) to the SRNS 20s. It is convenient to think of this data as being sent in the form of one or more packets that have a specific data structure, and which travel along one of a plurality of radio bearers (RBs) 28, 48. An RB 28 established on the SRNS 20s will have a corresponding RB 48 established on the UE 40. The RBs 28, 48 are numbered consecutively, from RB0 to RB31. Typically, RB0 to RB4 are dedicated signaling RBs (SRBs), which are used for passing protocol signals between the UTRAN 20u and the UE 40. RBs 28, 48 greater than four (i.e., RB5, RB6, etc.) are typically used to carry user data.

The RNC 22 utilizes a Node B 24, which is selected by the UE 40 by way of a Cell Update procedure, to transmit data to, and receive data from, the UE 40. The Cell Update procedure is initiated by the UE 40 to change a cell as defined by a Node B 24.

Selection of a new cell region will depend, for example, upon the location of the UE 40 within the domain of the SRNS 20s. The UE 40 sends data to the wireless communications network 10, which is then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 22 of the DRNS 20d forwards the received signal to the SRNS 20s. The SRNS 20s uses this forwarded signal from the DRNS 20d, plus the corresponding signals from its own Node B 24 to generate a combined signal that is then decoded and finally processed into packet data. The SRNS 20s then forwards the received data to the CN 30. Consequently, all communications between the UE 40 and the CN 30 must pass through the SRNS 20s.

Please refer to FIG. 3 in conjunction with FIG. 1. FIG. 3 is a simple block diagram of a UMTS radio interface protocol architecture, as used by the communications network 10. Communications between the UE 40 and the UTRAN 20u is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the cells is responsible for transmitting/receiving signals to/from UE 40. Layer 2 includes a packet data convergence protocol (PDCP) layer 70, a Radio Link Control (RLC) layer 72, and a Medium Access Control (MAC) layer 74. Layer 3 includes Radio Resource Control (RRC) layer 80 and some Non Access Stratum (NAS) layers, e.g. Call Control (CC), Mobility Management (MM), etc. The U-plane 94 handles user data transport between the UE 40 and the UTRAN 20u, whereas the C-plane 92 handles transport for signaling data between the UE 40 and the UTRAN 20u. The RRC 80 sets up and configures all RBs 28, 48 between the UTRAN 20u and the UE 40. The PDCP layer 22 provides header compression for Service Data Units (SDUs) received from the U-plane 94. The RLC layer 72 provides segmentation of PDCP 70 SDUs and RRC 80 SDUs into RLC protocol data units (PDUs), and under acknowledged mode (AM) transfers, can provide upper layers (such as the PDCP layer 70 or the RRC layer 80) with a confirmation that RLC PDUs have been successfully transmitted and received between the UTRAN 20u and the UE 40. The MAC layer 74 provides scheduling and multiplexing of RLC PDUs onto the transport channel, interfacing with the physical layer 60. It is the RRC layer 80 that is responsible for the establishment and configuring of the RBs 28, 48.

A number of reconfiguration procedures are available to the RRC layer 80 to setup and configure RBs 28, 48. These procedures involve the UTRAN 20u sending a specific message to the UE 40 along an RB 28, 48, and the UE 40 responding in turn with a corresponding message. Typically, the message is sent along RB2, which is an SRB. The messages include Radio Bearer Setup, Radio Bearer Reconfiguration, Radio Bearer Release, Transport Channel Reconfiguration, and Physical Channel Reconfiguration. For each of these reconfiguration messages, the UE 40 has a corresponding "Complete" or "Failure" response message indicating success or failure of the procedure on the UE 40 side, and which may provide the UTRAN 20u any necessary information for the UTRAN 20u to complete the procedure. The reconfiguration messages and the corresponding response messages can carry information elements (IEs), which are fields of data that hold ancillary information. In addition to these reconfiguration procedures, there also exists a Cell Update procedure, which originates with a Cell Update message from the UE 40 and is responded to by the UTRAN 20u. The Cell Update procedure is used by the UE 40 to indicate a change of cell location (i.e., Node B 24). The UE 40 initiates a Cell Update procedure in a variety of cases;

to uplink data transmitted from the UE 40 to the UTRAN 20u, as a paging response, due to a radio link failure, re-entering a service area, due to an RLC 72 unrecoverable error, a periodical cell update, and for cell reselection.

Due to traffic loads at different Node Bs 24, movement of the UE 40, and because the effective ranges of neighboring cells normally overlap at least in part, the quality of signal between the UE 40 and the cells varies. The purpose of cell reselection is to always camp on a cell (Node B 24) with good enough quality for effective communications, even if that cell is not the optimal cell at the time. A cell reselection evaluation procedure is performed to find out if another cell offering better signal quality exists when triggered by the UE 40 or when system information relevant to cell reselection changes. One system factor relevant to cell reselection is defined in the IE "Cell_selection_and_reselection_ quality_measure" to indicate using Received Signal Code Power (RSCP) of a Common Pilot Channel (CPICH) or received energy per chip divided by the power density ($Ec/N_0$) of a Common Pilot Channel (CPICH) in the serving cell as the quality value of the received signal Qmeas for FDD cells. The relevant system information transmitted by the serving cell 24 on an SRB includes other information such as whether or not a Hierarchical Cell Structure (HCS) is operating and parameters for all counters, timers, offsets, and thresholds used to control the cell reselection process.

The first step in the cell reselection process is to select candidate neighboring cells based on measurement rules and perform measurements on those cells. These measurement rules differ for intra-frequency, inter-frequency, and inter-RAT measurements. Secondly, the signal quality level of the serving cell 24 and system information provided thresholds are used to select candidate neighboring cells (adjacent Node Bs 24) fulfilling certain predefined requirements, known as S criterion. If an HCS is indicated in the system information, it is possible to further restrict candidate cells to only those cells having a higher HCS priority than the serving cell. It also may be necessary to take the motion of the UE 40 into account. If the number of reselections during a system indicated time period Tcrmax exceeds a system indicated number Ncr, the UE 40 is considered to be fast moving and candidates are chosen from neighboring cells having an equal or lower HCS priority than the serving cell. Some cells, including possibly the serving cell, are excluded from being potential candidates according to other predefined rules, such excessive load on those cells.

When HCS is used, an additional quality level threshold criterion H is used to identify target cells on a different layerand is shown in FIG. 4 and FIG. 5. This H criterion is not applied for fast moving UEs 40. For all terms in the FIG. 4 to FIG. 6, the subscripts "s" indicate the serving cell and the subscript "n" indicates the respective candidate neighboring cell that is currently being measured or ranked. The term "Qmeas" indicates the quality value of the received signal derived from the averaged CPICH $Ec/N_0$ or CPICH RSCP for FDD cells, from the averaged P-CCPCH RSCP for TDD cells and from the averaged received signal level for GSM cells. The term "Qhcs" specifies a quality threshold level for applying prioritized hierarchical cell reselection. The term "TO*L" is a time dependent temporary offset defined in FIG. 5. In FIG. 5, the term "TEMP_OFFSET" equates to one of two system offsets depending on the reselection setting of the quality value of the received signal for FDD cells (i.e. IE "Cell_selection_and_reselection_ quality_measure" defined in 3 GPP TS 25.331 section 10.3.2.3) and specifies an temporary offset applied to H and R criterion. The term "PENALTY_TIME" indicates the time duration during which the temporary offset is to be applied to the neighboring cell. The term "T" is a timer in the UE 40 (one corresponds to each target cell) that is started at zero when certain conditions are met. The function W(PENALTY_TIME−T) is equal to zero when the timer T is greater than the PENALTY_TIME and equal to one when the timer T is less than or equal to the PENALTY_TIME. The term "L" is zero when the HCS priority of an HCS serving cell (HCS_PRIOs) is equal to the HCS priority of an HCS candidate neighboring cell (HCS_PRIOn), otherwise "L" is equal to one.

Once the UE 40 has selected candidate cells that fulfill the S and the H criterion, the signal quality of candidate cells is evaluated and the candidates are ranked according to an R criterion shown in FIG. 5 and FIG. 6. The term "Qmeas" again indicates the signal quality for the respective cell. The term "Qhyst" equates to one of two system constants specifying a hysteresis value depending on the reselection setting of the quality value of the received signal for FDD cells (i.e. IE "Cell_selection_and_reselection_quality_measure" defined in 3 GPPTS 25.331 section 10.3.2.3). The term "Qoffset" specifies an offset between the two cells and equates to one of two system determined offsets depending on the reselection setting of the quality value of the received signal for FDD cells(i.e. IE "Cell_selection_and_reselection_quality_measure" defined in 3 GPPTS 25.331 section 10.3.2.3). The term "TO*(1−Ln)" again is a time dependent temporary offset defined in FIG. 5.

If all the above criteria are met during a time interval Treselection, the cell with highest R ranking is normally chosen to be the new serving cell. Note that the serving cell is also ranked and may be the highest ranked candidate cell, if all the above criteria are met for serving cell during a time interval Treselection. Both the H and the R criteria comprise factors that, in certain circumstances, involve the application of the temporary offset for a system defined time duration PENALTY_TIME. The purpose of the temporary offset is to help insure that cell reselection does not occur as a result of a brief fluctuation in signal strength of a candidate cell. The temporary offset effectively requires a stronger, sustained signal strength to qualify for reselection. The application of the temporary offset is then multiplied by the L term (in the case of H) or by (1−L) in the case of R.

Obviously, the L term can eliminate the temporary offset due to the multiplication, leading to a problem when an HCS system is used. As can be seen in FIG. 4 and FIG. 5, for the quality threshold criterion H, during quality estimation of candidate cells, the temporary offset applies for PENALTY_TIME to cells on a different HCS priority level as the serving cell. For the quality level threshold criterion H, the temporary offset will be applied if HCSn < > HSCs (the serving cell and the target cell have different HCS priority levels) and Qmeasn−Qhcsn>0 (the quality of signal for the target cell is greater than the system threshold) if any cell has fulfilled the criterion H>=0. This means that the temporary offset will be applied for PENALTY_TIME to a neighboring cell only while it is possible for that neighboring cell to become a candidate cell.

However, as can be seen in FIG. 5 and FIG. 6, for the cell-ranking criterion R, the temporary offset applies for PENALTY_TIME to the cells on the same HCS priority level as the serving cell. For the cell-ranking criterion R, the temporary offset will be started if HCSs=HCSn (the serving cell and the target cell have the same HCS priority level) and Qmeasn>Qmeass+Qoffset (the quality of signal of the target cell is greater than the quality of signal for the serving cell plus the system specified offset). Because the quality of signal must be measured before candidate cells can be ranked, or re-ranked as the case may be, the timer Tn may be started prior to the ranking of candidate cells. Because starting the timer will apply the temporary offset and applying the temporary offset effectively reduces a candidate cell's ranking, the temporary offset may be applied while the ranking Rn of the target cell is less than the ranking Rs of the current serving cell. Applying the temporary offset in this manner is not reasonable because the penalty will be applied too early (while the candidate cell is ineligible for reselection) and become invalid.

Please refer to FIG. 7. FIG. 7 is a graph illustrating the scenario described above. In the graph, the upper horizontal line designates an Rs criterion ranking for the serving cell. In this example, the ranking Rs of the serving cell is assumed to remain constant. The lower horizontal line indicates when the measured quality of signal of an HCS target cell equals the quality of signal of the serving cell plus the applicable system defined offset. The wavy, somewhat diagonal line indicates an example ranking Rn over time for the HCS target cell.

In the example, at time T1, while the ranking Rn for the target cell is less than the ranking Rs of the serving cell, the prior art specification states that the timer Tn for applying the temporary offset is started because the quality of signal for the target cell is greater than the quality of signal for the serving cell plus the applicable offset (Qmeasn>Qmeass+Qoffsetsn). If the duration PENALTY_TIME is equal to T2−T1, the timer Tn becomes equal to the PENALTY_TIME and the temporary offset is eliminated at time T2. The timer Tn is not reset to reapply or continue the temporary offset because the criteria for starting the timer Tn remains valid and the serving cell has not changed.

At time T3, the ranking Rn of the target cell reaches equality with the ranking Rs of the serving cell making the target cell now eligible for reselection. The higher-ranking Rn of the target cell could be the result of some temporary influence and immediately return to a lower ranking Rn when the influence is gone. However, immediately after reaching this equality, because the ranking Rn now exceeds the ranking Rs, the UE 40 reselects to the target cell without applying the penalty temporary offset. The purpose of applying the temporary offset is to help insure that cell reselection does not occur as a result of a brief fluctuation in signal strength of a candidate cell by requiring a larger, sustained signal strength to qualify for reselection.

SUMMARY OF INVENTION

It is therefore a primary objective of the claimed invention to disclose an improved device and method for cell reselection in a $3^{rd}$ Generation Partnership Project (3GPP) service area such that a temporary offset will not be applied to candidate cells until when that candidate cell is eligible for reselection.

Briefly summarized, the claimed invention discloses an improved method of determining when to start a timer that applies a temporary offset to the signal quality measurement of a cell that is a candidate for reselection. More specifically, for a cell ranking criterion R, the claimed invention starts the timer to apply the temporary offset according to the following rules when the priorities of the serving cell and the candidate cell are the same in a Hierarchical Cell Structured wireless communications system:

1) If the serving cell and the candidate cell are both Frequency Division Duplex cells, the quality value of the received signal for FDD cells is derived from CPICH RSCP in the serving cell, and Qmeasn>Qmeass+Qoffsetsn+Qhysts, wherein the system information supplied offset (Qoffsetsn) equals a first value, i.e. $Qoffset1_{s,n}$ defined in 3 GPP TS 25.331 section 10.3.2.4.

2) If the serving cell and the candidate cell are both Frequency Division Duplex cells, the quality value of the received signal for FDD cells is derived from CPICH Ec/N$_0$ in the serving cell, and Qmeasn>Qmeass+Qoffsetsn+Qhysts, wherein the system information supplied offset (Qoffsetsn) equals a second value, i.e. $Qoffset2_{s,n}$ defined in 3 GPPTS 25.331 section 10.3.2.4.

3. For all other serving and candidate cells, Qmeasn>Qmeass+Qoffsetsn+Qhysts, wherein the system information supplied offset (Qoffsetsn) equals the first value, i.e. $Qoffset1_{s,n}$ defined in 3GPPTS 25.331 section 10.3.2.4.

A claimed invention mobile unit that uses the improved cell reselection computer code includes a housing, a central processor, a timer for applying the temporary offset, and a memory. The memory includes computer code for determining if the quality value of the received signal for FDD cells is derived from CPICH RSCP or from CPICH Ec/N$_0$ in the serving cell and improved cell ranking computer code that applies the claimed invention rules for starting the timer.

It is an advantage of the claimed invention that the improved computer code utilizes the above three rules to start the temporary offset applying timer in the mobile unit only when the candidate cell is eligible for reselection, insuring that the temporary offset is applied correctly for a predetermined length of penalty time and reselection to a new serving cell does not occur prematurely.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 4 illustrates H criteria for cell reselection in the wireless communications system of FIG. 1.

FIG. 5 illustrates the procedure for calculating a temporary offset used during cell reselection in the wireless communications system of FIG. 1.

FIG. 6 illustrates R criteria for cell reselection in the wireless communications system of FIG. 1.

DETAILED DESCRIPTION

As previously stated, a mobile unit in a $3^{rd}$ Generation Partnership Project (3GPP) service area performs a cell reselection procedure in order to camp on a more suitable serving cell than is currently being used. To reselect to a new serving cell, the mobile unit gathers a list of candidate cells comprised of neighboring cells based on predefined selection criterion S. When in a Hierarchical Cell Structure (HCS) wireless communications system, a slow moving mobile unit additionally applies quality threshold criterion H to prioritize candidate cells according to HCS priorities assigned to the candidate cells by the communications system. Measurements of the signal quality of candidate cells are then used to rank the candidate cells according to R criterion. The highest ranked candidate cell is normally reselected to be the new serving cell if that candidate cell fulfills the all of these criterion for a predetermined time period. Obviously, it is possible for the current serving cell to reselect to itself if all other candidate cells are ranked lower than the current serving cell. Because of this, candidate cells are not eligible for reselection if ranked lower than the current serving cell. Details of the respective criteria and the reselection process can be found in 3GPP TS 25.304 V3.12.0 (2002–12)"UE Procedures in Idle Mode and Procedures for Cell Reselection in Connected Mode".

During application of the R criterion for ranking the candidate cells, the solution to prior art problem of starting a timer in the mobile unit to apply a temporary offset to the measured signal quality of a candidate cell when that candidate cell may be lower ranked than the current serving cell can be derived as follows. The specification states that when HCS is used and when the HCS priority of the serving cell equals the HCS priority of the candidate cell, the timer will be started when the signal quality of the candidate cell (Qmeasn) is greater than the signal quality of the serving cell (Qmeass) plus a system specified offset between the two cells (Qoffsetsn). In other words, Qmeasn>Qmeass+Qoffsetsn starts the timer.

Figure 1:
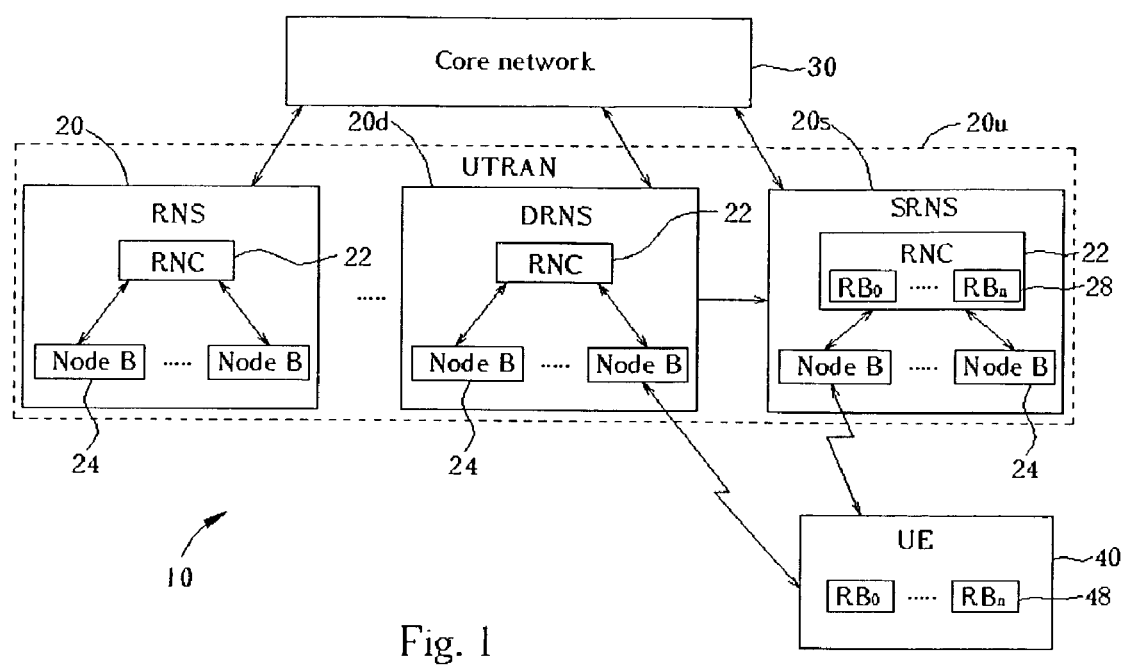
FIG. 1 is a block diagram of a wireless communications system.
Figure 2:
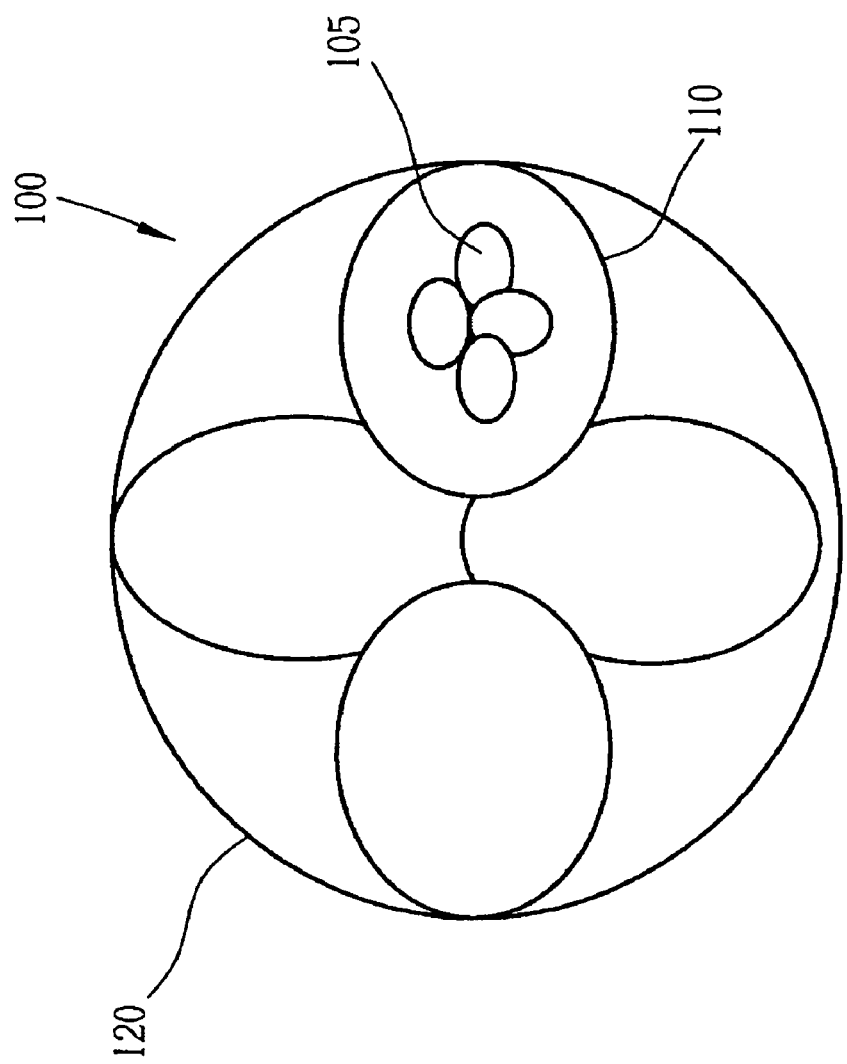
FIG. 2 is a functional diagram of a hierarchical cell structure in the wireless communications system of FIG. 1.
Figure 3:
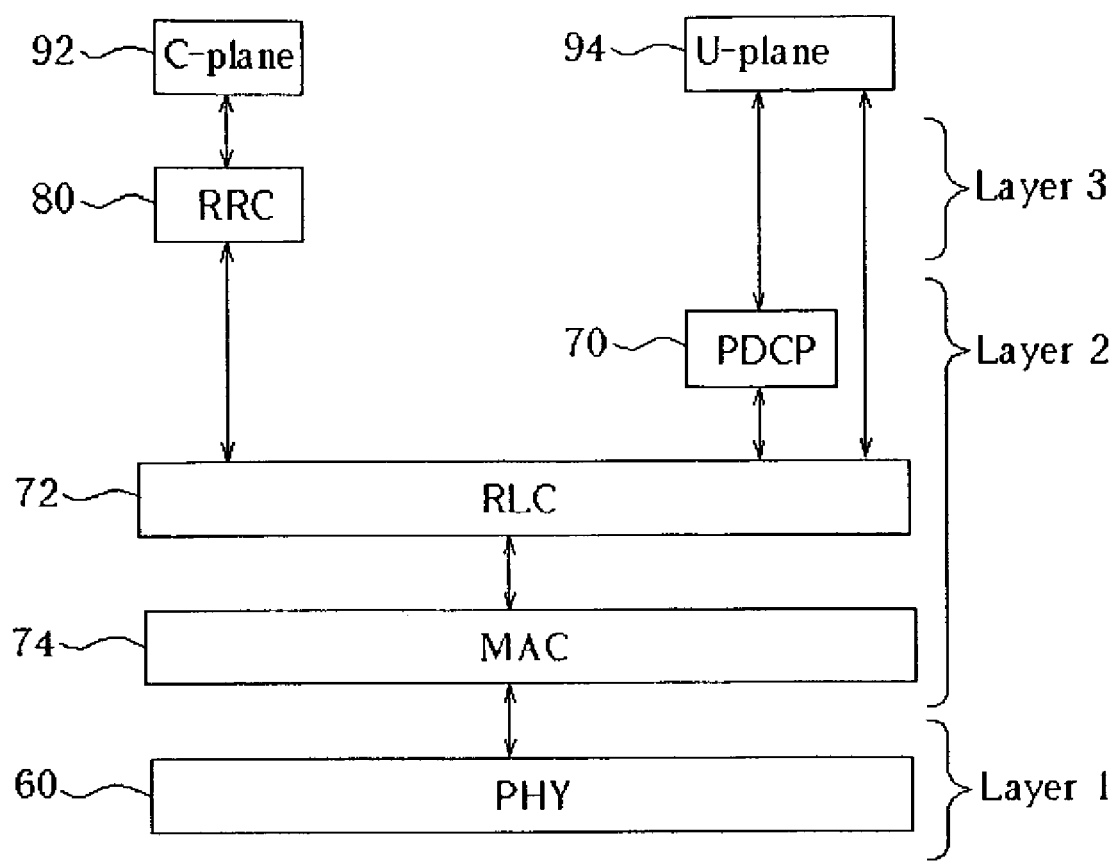
FIG. 3 is a simple block diagram of a UMTS radio interface protocol architecture of the wireless communications system of FIG. 1.
Figure 7:
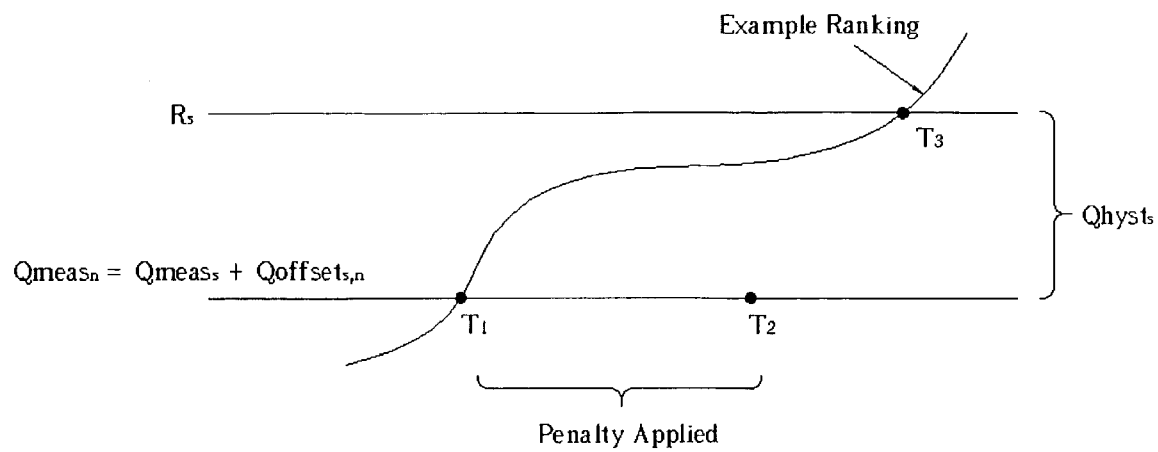
FIG. 7 is a graph of relative cell rankings in the wireless communications system of FIG. 1.

Please refer again to FIG. 6 that shows the calculation for the rankings of the serving cell and a candidate cell. The candidate cell's ranking should be greater than the ranking of the serving cell, or Rn>Rs, before starting the timer. The timer should not be started when Rn<=Rs. When the timer is not running, the temporary offset shown in FIG. 5 is not applied. Therefore, Rn>Rs occurs when Qmeasn−Qoffsetsn>Qmeass+Qhysts. This formula can be rewritten as Qmeasn>Qmeass+Qoffsetsn+Qhysts. (Qhysts is a system information supplied hysteresis value for the serving cell and shown in FIG. 7). Thus, the corrected computer code specifying to start the timer after the candidate cell becomes eligible for reselection is Qmeasn>Qmeass +Qoffsetsn+Qhysts.

More specifically, in a Hierarchical Cell Structured wireless communications system, for the cell ranking criterion R, the present invention starts the timer to apply the temporary offset according to the following rules when the priorities of the serving cell and the candidate cell are the same:

1) If the serving cell and the candidate cell are both Frequency Division Duplex cells, the quality value of the received signal for FDD cells is derived from CPICH RSCP in the serving cell, and Qmeasn>Qmeass+Qoffsetsn+Qhysts, wherein the system information supplied offset (Qoffsetsn) equals a first value, i.e.$Qoffset1_{s,n}$ defined in 3GPP TS 25.331 section 10.3.2.4.

2) If the serving cell and the candidate cell are both Frequency Division Duplex cells, the quality value of the received signal for FDD cells is derived from CPICH $Ec/N_0$ in the serving cell, and Qmeasn>Qmeass+Qoffsetsn+Qhysts, wherein the system information supplied offset (Qoffsetsn) equals a second value, i.e.$Qoffset2_{s,n}$ defined in 3GPP TS 25.331 section 10.3.2.4.

3. For all other serving and candidate cells, Qmeasn>Qmeass+Qoffsetsn+Qhysts, wherein the system information supplied offset (Qoffsetsn) equals the first value, i.e.$Qoffset1_{s,n}$ defined in 3 GPPTS 25.331 section 10.3.2.4.

Figure 8:
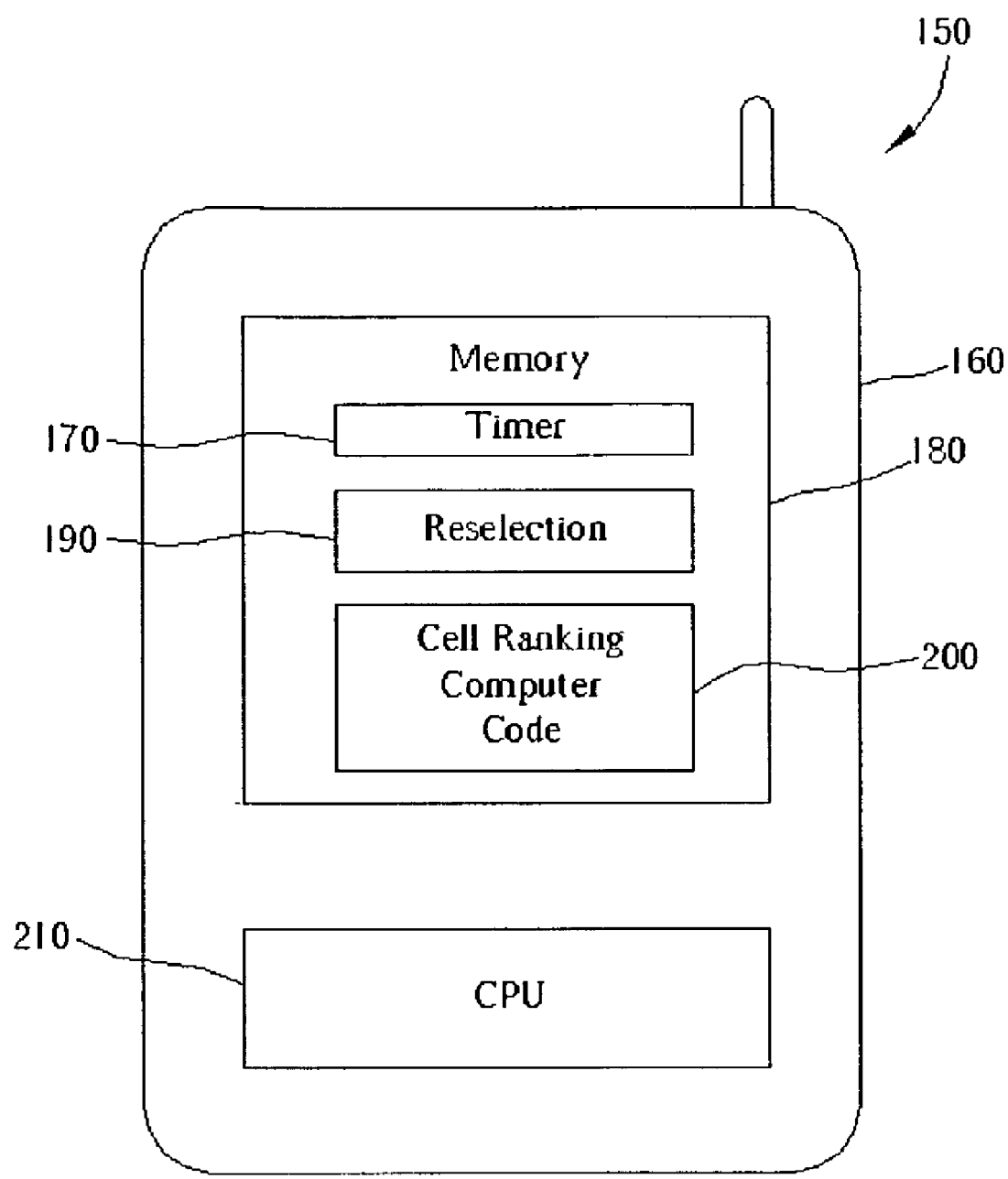
FIG. 8 is a mobile unit according to the present invention for use in the wireless communications system of FIG. 1.

A mobile unit 150 that uses the above cell reselection computer code and method is shown in FIG. 8 and comprises a housing 160, a central processor 210 for executing computer code, a timer 170 for applying the temporary offset, and a memory 180. The memory 180 comprises computer code 190 for determining if the quality value of the received signal for FDD cells is derived from CPICH RSCP or from CPICH $Ec/N_0$ in the serving cell and additionally comprises improved cell ranking computer code 200 that applies the present invention rules for starting the timer. The mobile unit 150 also comprises an RRC for establishing at least a radio bearer for receiving system information from the serving cell.

The present invention uses improved computer code that utilizes the above three rules to start the timer in the mobile unit that applies the temporary offset only when the candidate cell is eligible for reselection, insuring that the temporary offset is applied correctly for a predetermined length of penalty time and reselection to a new serving cell does not occur prematurely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An improved method for serving cell reselection by a mobile unit in a Hierarchical Cell Structure (HCS) wireless communications system, each cell in the HCS wireless communications system having an assigned HCS priority, the mobile unit comprising a Radio Resource Control (RRC) used to establish at least a radio bearer for receiving system information transmitted from the serving cell to the mobile unit when the mobile unit is within a service area of the serving cell, the method comprising:

if the HCS priority of the serving cell equals the HCS priority of a candidate cell, starting a timer after a measured signal quality of the candidate cell is greater than a sum of a measured signal quality of the serving cell plus a system information supplied offset between the serving cell and the candidate cell plus a system information specified hysteresis value for the serving cell to apply a temporary offset to obtain adjusted signal quality measurements of the candidate cell, the temporary offset being distinct from the system information supplied offset between the serving cell and the candidate cell, the system information specified hysteresis value for the serving cell, and the sum of both the system information supplied offset between the serving cell and the candidate cell and the system information specified hysteresis value for the serving cell, the adjusted signal quality measurements used for ranking that candidate cell for reselection; and completing cell reselection according to the adjusted measured signal quality of the candidate cell.

2. The method of claim 1 wherein the serving cell and the candidate cell are both Frequency Division Duplex cells, the quality value of the received signal for FDD cells is derived from Received Signal Code Power (RSCP) of Common Pilot Channel (CPICH) in the serving cell, and the system information supplied offset equals a first value.

3. The method of claim 1 wherein the serving cell and the candidate cell are both Frequency Division Duplex cells, the quality value of the received signal for FDD cells is derived from received energy per chip divided by the power density (Ec/N$_0$) of Common Pilot Channel (CPICH) in the serving cell, and the system information supplied offset equals a second value.

4. A mobile unit for use in a Hierarchical Cell Structure (HCS) wireless communications system, each cell in the HCS wireless communications system having an assigned HCS priority, the mobile unit in radio contact with a serving cell and capable of reselecting to a candidate cell, the serving cell broadcasting system information to be used by the mobile unit in a cell reselection process, the mobile unit comprising:
a housing;
a timer for applying a temporary offset to a signal quality measurement of the candidate cell for a predetermined time interval;
a central processing unit for executing computer code; and
a memory comprising:
computer code for determining a quality measure for cell reselection setting in the serving cell; and
improved computer code for starting a timer to apply a temporary offset to signal quality measurements of the candidate cell when the candidate cell qualifies for reselection, the temporary offset being distinct from the system information supplied offset between the serving cell and the candidate cell, the system information specified hysteresis value for the serving cell, and the sum of both the system information supplied offset between the serving cell and the candidate cell and the system information specified hysteresis value for the serving cell, the adjusted signal quality measurements used for ranking that candidate cell for reselection;
wherein the improved computer code starts the timer if the HCS priority of the serving cell equals the HCS priority of the candidate cell and after the measured signal quality of the candidate cell is greater than the sum of a measured signal quality of the serving cell plus a system information supplied offset between the serving and the candidate cell plus a system information specified hysteresis value for the serving cell.

5. The mobile unit of claim 4 wherein when the serving cell and the candidate cell are both Frequency Division Duplex cells, the computer code indicates the quality value of the received signal for FDD cells is derived from Received Signal Code Power (RSCP) of Common Pilot Channel (CPICH) in the serving cell, the improved computer code utilizes a system information supplied offset equal to a first value.

6. The mobile unit of claim 4 wherein the serving cell and the candidate cell are both Frequency Division Duplex cells, the computer code indicates the quality value of the received signal for FDD cells is derived from received energy per chip divided by the power density (Ec/N$_0$) of Common Pilot Channel (CPICH) in the serving cell, the improved computer code utilizes a system information supplied offset equal to a second value.

7. A method of ranking candidate cells during a cell reselection procedure in a Hierarchical Cell Structure (HCS) wireless communications system, each cell in the HCS wireless communications system having an assigned HCS priority, the wireless communications system comprising a mobile unit and a serving cell, the mobile unit having a Radio Resource Control (RRC) for establishing at least a radio bearer for receiving system information transmitted from the serving cell to the mobile unit when the mobile unit is within a service area of the serving cell, the method comprising:
selecting candidate neighboring cells according to predetermined measurement rules using system information supplied thresholds;
starting a timer in the mobile unit for application of a temporary offset adjusting signal quality measurements of a candidate cell after that candidate cell qualifies for reselection, the temporary offset being distinct from the system information supplied offset between the serving cell and the candidate cell, the system information specified hysteresis value for the serving cell, and the sum of both the system information supplied offset between the serving cell and the candidate cell and the system information specified hysteresis value for the serving cell; and
ranking candidate cells according to the adjusted signal quality measurements for each candidate cell.

8. The method of claim 7 wherein the candidate cell qualifies for reselection when the ranking of the candidate cell is greater than the ranking of the serving cell.

9. The method of claim 7 wherein the candidate cell qualifies for reselection if the HCS priority of the serving cell equals the HCS priority of a candidate cell and the measured signal quality of the candidate cell is greater than the sum of a measured signal quality of the serving cell plus a system information supplied offset between the serving and the candidate cell plus a system information specified hysteresis value for the serving cell.

10. The method of claim 9 wherein the serving cell and the candidate cell are both Frequency Division Duplex cells, the quality value of the received signal for FDD cells is derived from Received Signal Code Power (RSCP) of Common Pilot Channel (CPICH) in the serving cell, and the system information supplied offset equals a first value.

11. The method of claim 9 wherein the serving cell and the candidate cell are both Frequency Division Duplex cells, the quality value of the received signal for FDD cells is derived from received energy per chip divided by the power density (Ec/N$_0$) of Common Pilot Channel (CPICH) in the serving cell, and the system information supplied offset equals a second value.

12. The method of claim 9 further comprises reselecting to the highest ranked cell if all criteria for that highest ranked time are fulfilled during a predetermined time interval.

\* \* \* \* \*